(12) United States Patent
Tamura

(10) Patent No.: US 10,044,236 B2
(45) Date of Patent: Aug. 7, 2018

(54) STATOR FOR ROTATING ELECTRIC MACHINE

(71) Applicant: DENSO CORPORATION, Kariya, Aichi-pref. (JP)

(72) Inventor: Akito Tamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 191 days.

(21) Appl. No.: 15/225,242

(22) Filed: Aug. 1, 2016

(65) Prior Publication Data

US 2017/0033619 A1  Feb. 2, 2017

(30) Foreign Application Priority Data

Jul. 31, 2015 (JP) .................. 2015-152554

(51) Int. Cl.
| | |
|---|---|
| *H02K 1/16* | (2006.01) |
| *H02K 3/12* | (2006.01) |
| *H02K 3/28* | (2006.01) |
| *H02K 3/30* | (2006.01) |

(52) U.S. Cl.
CPC .............. *H02K 1/16* (2013.01); *H02K 3/12* (2013.01); *H02K 3/28* (2013.01); *H02K 3/30* (2013.01); *H02K 2213/03* (2013.01)

(58) Field of Classification Search
CPC ............................................ H02K 3/00–3/528

USPC .............. 310/179, 180, 184, 195, 198
See application file for complete search history.

(56) References Cited

U.S. PATENT DOCUMENTS

| | | | |
|---|---|---|---|
| 2014/0210298 A1 | 7/2014 | Tamura | |
| 2014/0319952 A1* | 10/2014 | Kaneko | H02K 3/28 310/195 |
| 2014/0319953 A1* | 10/2014 | Rahman | H02K 3/28 310/198 |

* cited by examiner

*Primary Examiner* — Thomas Truong
(74) *Attorney, Agent, or Firm* — Oliff PLC

(57) ABSTRACT

A stator includes a stator core having slots and a stator coil comprised of three star-connected phase windings. In each of the slots, there are arranged in-slot portions of the phase windings in six layers. Each of the phase windings is comprised of five parallel-connected sub-windings. At each of the six layers, the in-slot portions of the sub-windings are arranged in a plurality of slot pairs; the slot pairs are circumferentially spaced from one another and each consist of two consecutive slots that are respectively identified as types A and B of the slots. Moreover, for each of the sub-windings, the in-slot portions of the sub-winding are evenly distributed to the two types A and B so that the number of the in-slot portions of the sub-winding arranged in the slots of the same type at each of the six layers is equal to 2.

6 Claims, 14 Drawing Sheets

ARRANGEMENT OF U1-U5

FIG.14 ARRANGEMENT OF U1
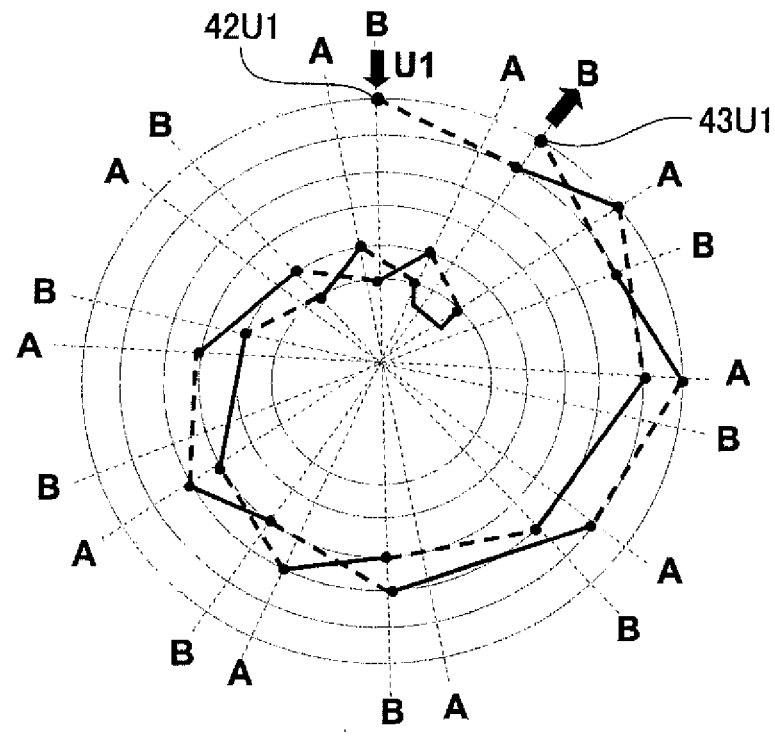
FIG.15 ARRANGEMENT OF U2
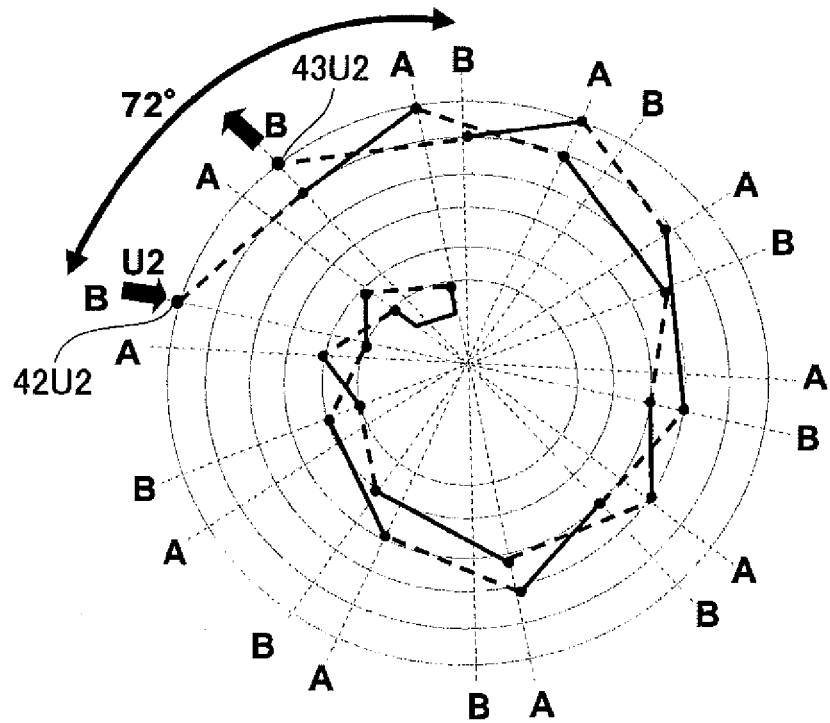

FIG.16    ARRANGEMENT OF U3
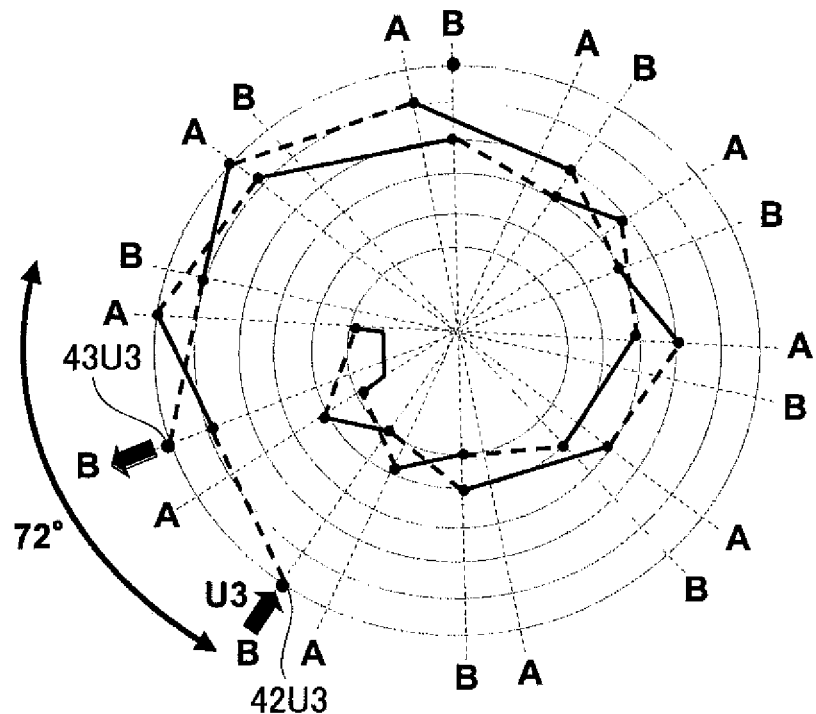
FIG.17    ARRANGEMENT OF U4
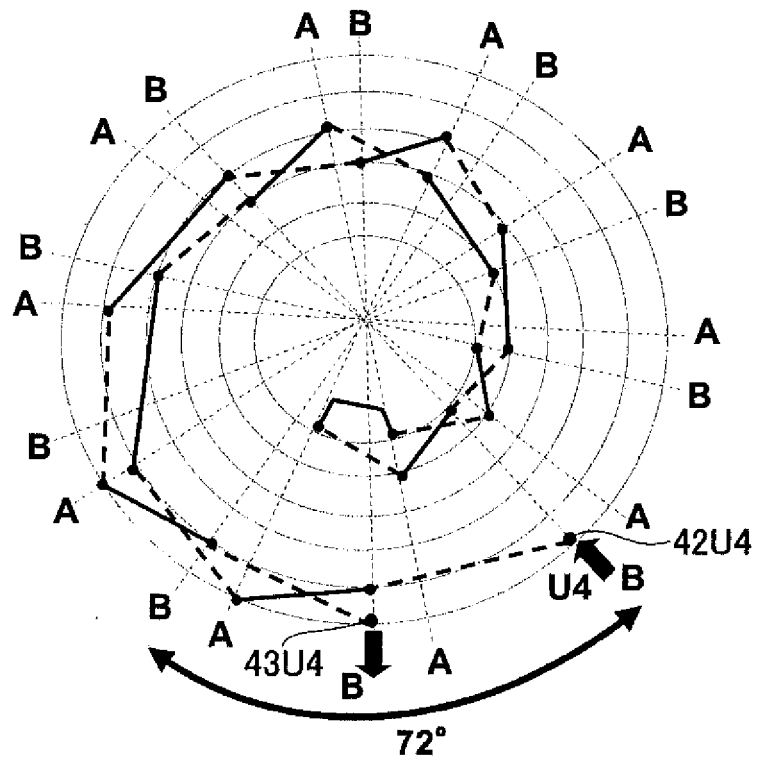

ARRANGEMENT OF U5

FIG.20

|  | U-PHASE SLOTS A | U-PHASE SLOTS B |
|---|---|---|
| 6TH LAYER | 2 | 2 |
| 5TH LAYER | 2 | 2 |
| 4TH LAYER | 2 | 2 |
| 3RD LAYER | 2 | 2 |
| 2ND LAYER | 2 | 2 |
| 1ST LAYER | 2 | 2 |

STATOR FOR ROTATING ELECTRIC MACHINE

CROSS-REFERENCE TO RELATED APPLICATION

This application is based on and claims priority from Japanese Patent Application No. 2015-152554 filed on Jul. 31, 2015, the content of which is hereby incorporated by reference in its entirety into this application.

BACKGROUND

1. Technical Field

The present invention relates to stators for rotating electric machines that are used in, for example, motor vehicles as electric motors and electric generators.

2. Description of Related Art

There are known rotating electric machines that are used in motor vehicles as electric motors and electric generators. These rotating electric machines generally include a rotor and a stator. The rotor is rotatably provided and functions as a field. The stator is disposed in radial opposition to the rotor and functions as an armature.

Japanese Patent Application Publication No. JP2014147190A discloses a stator for a rotating electric machine. The stator includes an annular stator core and a three-phase stator coil. The stator core has a plurality of slots arranged in a circumferential direction thereof. The stator coil is comprised of three phase windings (i.e., U-phase, V-phase and W-phase windings) that are mounted on the stator core so as to be received in the slots of the stator core and be different in electrical phase from each other. Each of the phase windings is comprised of two sub-windings that are connected parallel to each other. In addition, the phase windings are star-connected with each other to define a neutral point therebetween.

Moreover, there is also known a method of reducing the AC copper loss in such a known rotating electric machine as described above by increasing the number of the sub-windings of each of the phase windings of the stator coil. However, with the winding structure of the known rotating electric machine, it may be difficult to achieve an electrical balance between the parallel-connected sub-windings of each of the phase windings of the stator coil. Consequently, circulating current may be generated in the sub-windings, thereby increasing the electrical loss of the known rotating electric machine.

SUMMARY

According to one exemplary embodiment, there is provided a stator for a rotating electric machine. The stator includes an annular stator core and a three-phase stator coil. The stator core has a plurality of slots arranged in a circumferential direction thereof. The stator coil is comprised of three phase windings that are mounted on the stator core so as to be different in electrical phase from each other. The phase windings are star-connected with each other to define a neutral point therebetween. Each of the phase windings includes a plurality of in-slot portions each of which is received in one of the slots of the stator core. In each of the slots of the stator core, there are arranged K of the in-slot portions of the phase windings of the stator coil in K layers so as to be radially aligned with each other, where K is an even number. The number of the slots formed in the stator core per magnetic pole of a rotor of the rotating electric machine and per phase of the stator coil is set to M, where M is a natural number greater than or equal to 2. Each of the phase windings of the stator coil is comprised of L sub-windings that are connected parallel to each other, where L is an odd number greater than or equal to 3. For each of the sub-windings, the in-slot portion of the sub-winding which is arranged at the Nth layer in one of the slots of the stator core is electrically connected with the in-slot portion of the sub-winding which is arranged at the (N+1)th layer in another one of the slots, where N is a natural number greater than or equal to 1 and less than K. Each of the phase windings of the stator coil is mounted on the stator core so that at each of the K layers, the in-slot portions of the sub-windings of the phase winding are arranged in a plurality of slot groups; the slot groups are circumferentially spaced from one another and each consist of M consecutive slots of the stator core that are sequentially identified respectively as M different types of slots. The number of magnetic poles to be formed in the stator during operation of the rotating electric machine is set to a multiple of L. For each of the sub-windings of the phase windings of the stator coil, the in-slot portions of the sub-winding are evenly distributed to the M types of the slots at each of the K layers so that the number of the in-slot portions of the sub-winding arranged in the slots of the same type at each of the K layers is equal to the quotient of the number of the magnetic poles to be formed in the stator divided by L.

With the above configuration, it becomes possible to achieve an electrical balance between the parallel-connected sub-windings of each of the phase windings of the stator coil. Consequently, it becomes possible to prevent circulating current from being generated in the sub-windings, thereby minimizing the electrical loss of the rotating electric machine.

It is preferable that for each of the phase windings of the stator coil, the L sub-windings of the phase winding are arranged with rotational symmetry so as to be circumferentially offset from one another by an offset angle of 360°/L.

It is also possible that the number of the magnetic poles to be formed in the stator during operation of the rotating electric machine is set to 2×L.

Moreover, it is also preferable that the stator coil is wave-wound on the stator core.

BRIEF DESCRIPTION OF THE DRAWINGS

The present invention will be understood more fully from the detailed description given hereinafter and from the accompanying drawings of one exemplary embodiment, which, however, should not be taken to limit the present invention to the specific embodiment but are for the purpose of explanation and understanding only.

In the accompanying drawings:

FIG. 14 is a schematic view illustrating only the arrangement of a first sub-winding U1 of the U-phase winding;

FIG. 15 is a schematic view illustrating only the arrangement of a second sub-winding U2 of the U-phase winding;

FIG. 16 is a schematic view illustrating only the arrangement of a third sub-winding U3 of the U-phase winding;

FIG. 17 is a schematic view illustrating only the arrangement of a fourth sub-winding U4 of the U-phase winding;

FIG. 20 is a schematic view showing the number of in-slot portions of each of the sub-windings U1-U5 of the U-phase winding arranged at each of first to sixth layers in the U-phase slots A and B.

DESCRIPTION OF EMBODIMENT

Figure 1:
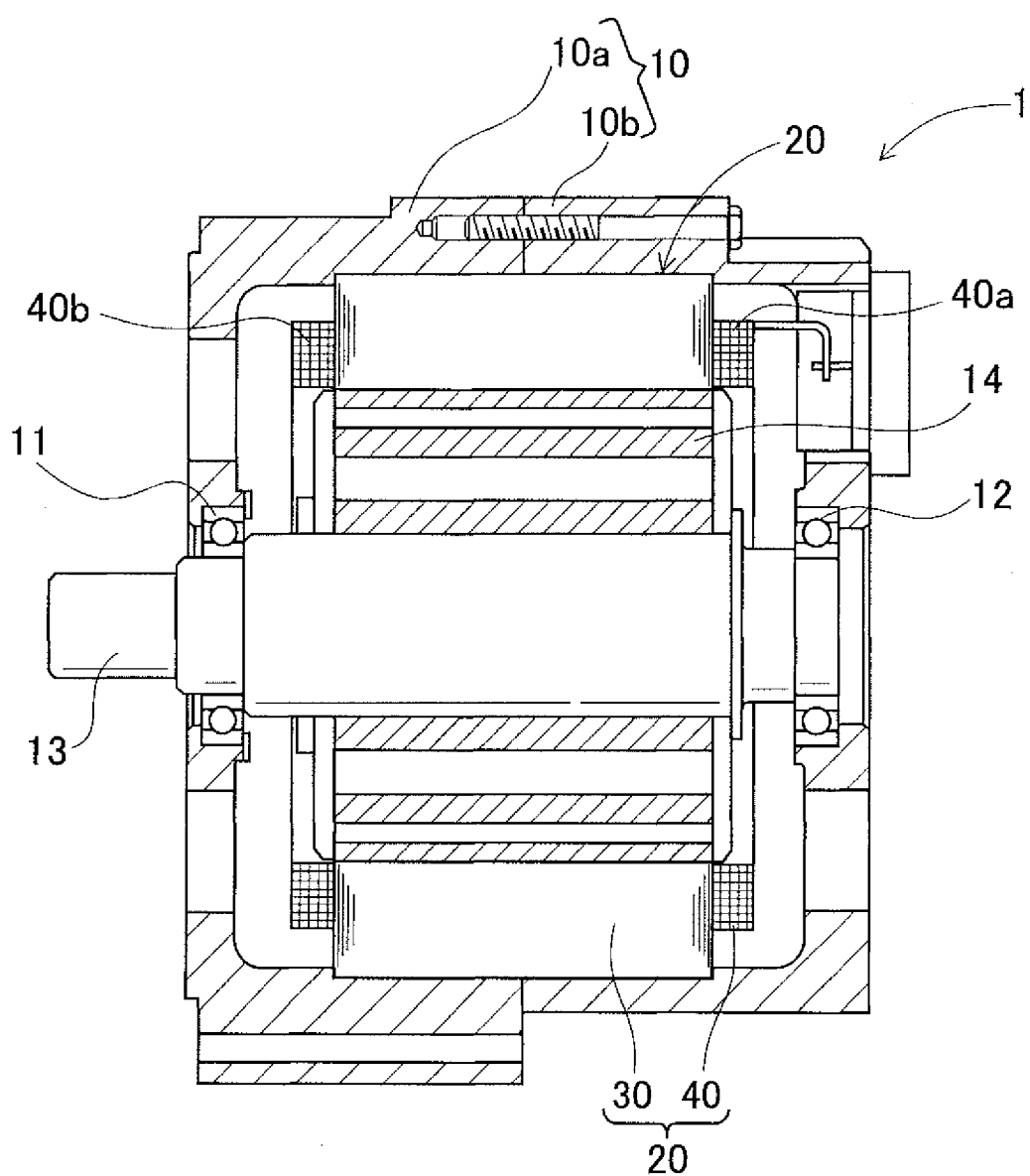
FIG. 1 is a partially cross-sectional view, taken along an axial direction, of a rotating electric machine which includes a stator according to the exemplary embodiment.

FIG. 1 shows the overall configuration of a rotating electric machine 1 which includes a stator 20 according to an exemplary embodiment.

The rotating electric machine 1 is designed to be used in a motor vehicle, such as a passenger car or truck, as an electric motor.

As shown in FIG. 1, the rotating electric machine 1 further includes a housing 10 and a rotor 14 in addition to the stator 20. The housing 10 is comprised of a pair of cup-shaped housing pieces 10a and 10b which are jointed together at the open ends thereof. The housing 10 has a pair of bearings 11 and 12 mounted therein, via which a rotating shaft 13 is rotatably supported by the housing 10. The rotor 14 is received in the housing 10 and fixed on the rotating shaft 13. The stator 20 is fixed in the housing 10 so as to surround the radially outer periphery of the rotor 14.

The rotor 14 has a plurality of permanent magnets embedded at predetermined positions therein. The permanent magnets form a plurality of magnetic poles on the radially outer periphery of the rotor 14 facing the radially inner periphery of the stator 20. The magnetic poles are arranged in the circumferential direction of the rotor 14 at predetermined intervals so that the polarities of the magnetic poles alternate between north and south in the circumferential direction. The number of the magnetic poles can be suitably set according to the design specification of the rotating electric machine 1. In the present embodiment, the number of the magnetic poles is set to be equal to, for example, 10 (i.e., 5 north poles and 5 south poles).

Figure 2:
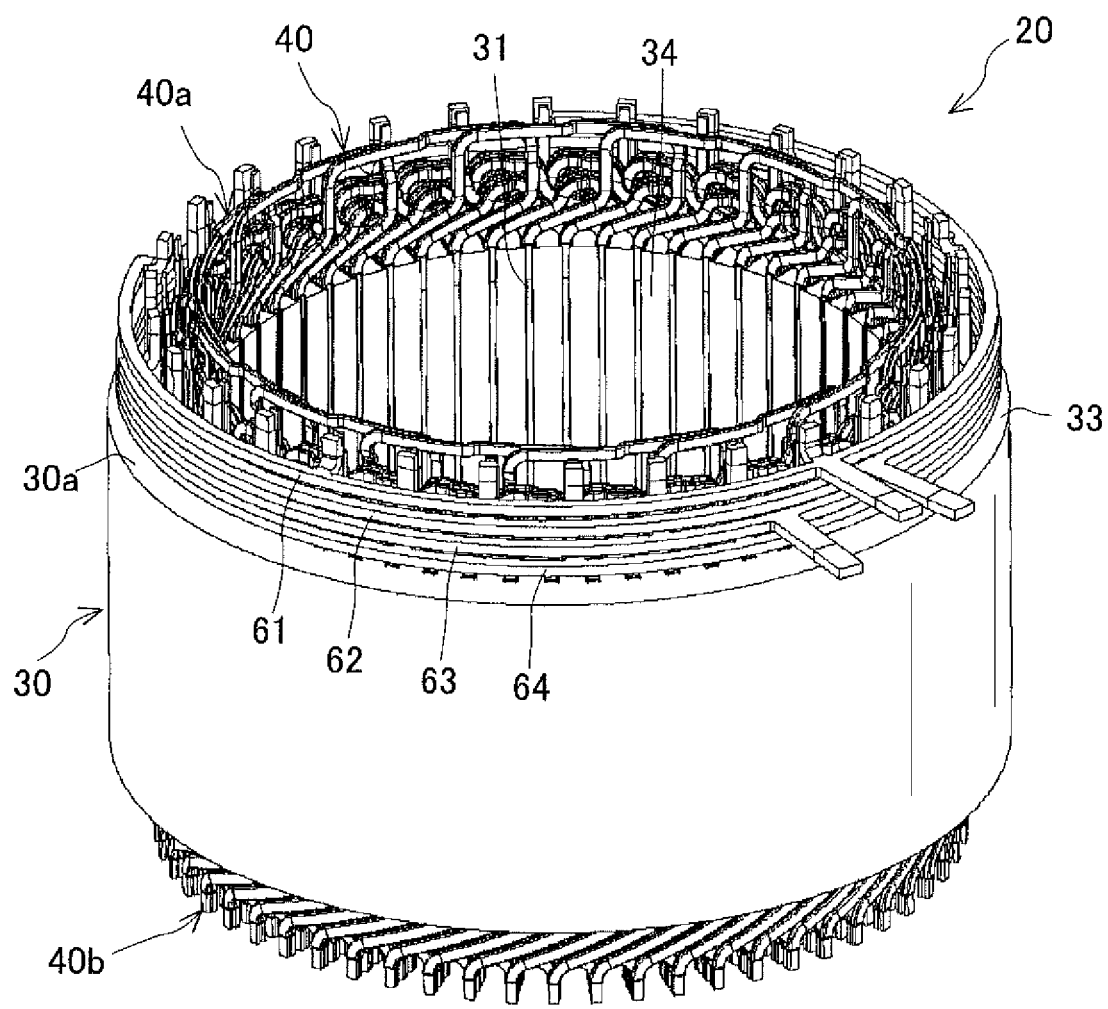
FIG. 2 is a perspective view of the stator.
Figure 3:
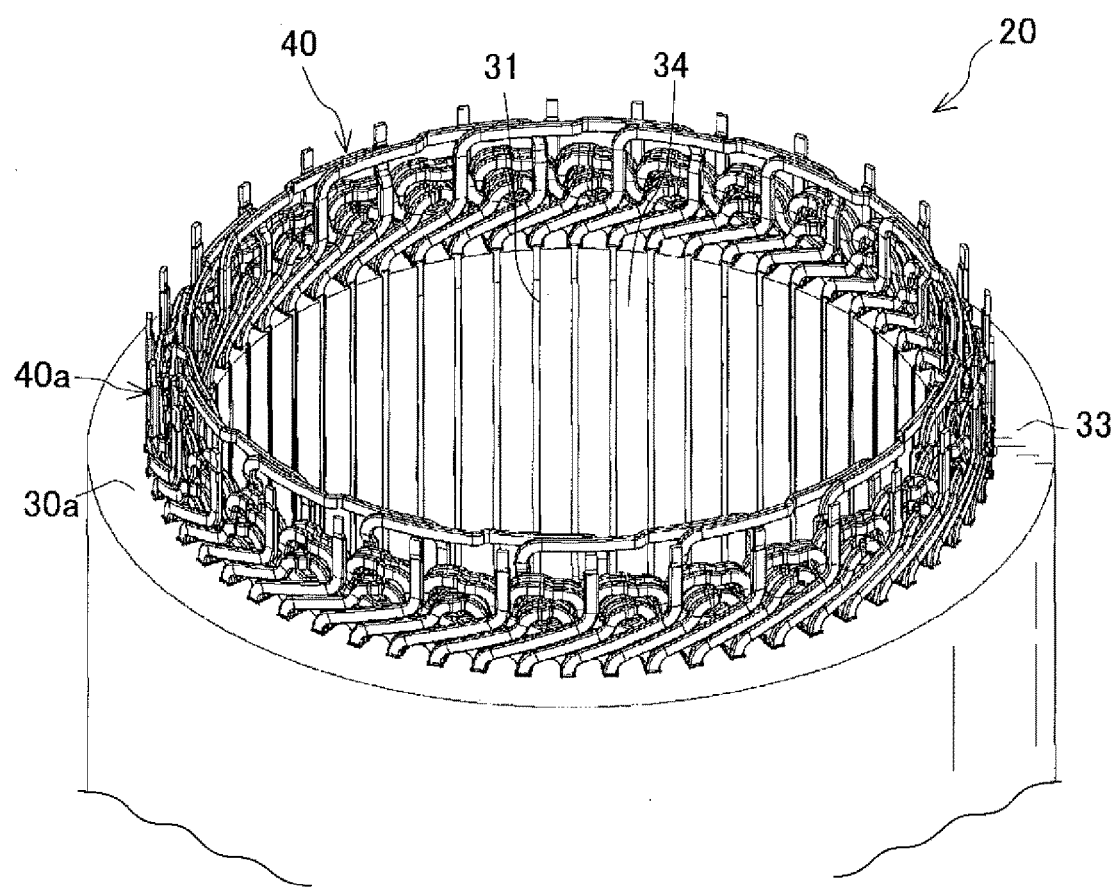
FIG. 3 is a perspective view of part of the stator including a first coil end part of a stator coil of the stator.

Referring now to FIGS. 2 and 3, the stator 20 includes: an annular (or hollow cylindrical) stator core 30 having a plurality of slots 31 arranged in the circumferential direction thereof; a three-phase stator coil 40 comprised of a U-phase winding 41U, a V-phase winding 41V and a W-phase winding 41W that are distributedly wave-wound on the stator core 30 so as to be received in the slots 31 of the stator core 30 and be different in electrical phase from each other; a U-phase busbar 61, a V-phase busbar 62 and a W-phase busbar 63 respectively electrically connecting the U-phase, V-phase and W-phase windings 41U, 41V and 41W of the stator coil 40 to an inverter (not shown); and a neutral busbar 64 electrically connecting the U-phase, V-phase and W-phase windings 41U, 41V and 41W of the stator coil 40 to define a neutral point therebetween.

In the present embodiment, the stator core 30 is formed by laminating a plurality of annular magnetic steel sheets in the axial direction of the stator core 30 and fixing them together by, for example, staking. In addition, between each adjacent pair of the magnetic steel sheets, there is interposed an insulating film. It should be appreciated that other conventional metal sheets may also be used instead of the magnetic steel sheets.

Moreover, as shown in FIGS. 2 and 3, the stator core 30 includes an annular back core 33 and a plurality of stator teeth 34 in addition to the aforementioned slots 31. The stator teeth 34 each extend radially inward from the back core 33 and are circumferentially spaced at a predetermined pitch. Each of the slots 31 is formed between one circumferentially-adjacent pair of the stator teeth 34. Accordingly, the slots 31 are circumferentially arranged at the same predetermined pitch as the stator teeth 34. Moreover, each of the slots 31 extends in the axial direction of the stator core 30 so as to axially penetrate the stator core 30 and opens on the radially inner surface of the stator core 30. In addition, for each of the slots 31, the depth direction of the slot 31 coincides with a radial direction of the stator core 30.

In the stator core 30, there are formed M slots 31 per magnetic pole of the rotor 14 that has the ten magnetic poles and per phase of the three-phase stator coil 40. Here, M represents a slot multiplier number which is a natural number greater than or equal to 2. In the present embodiment, the slot multiplier number M is set to be equal to 2. Accordingly, the total number of the slots 31 formed in the stator core 30 is equal to 60 (i.e., 2×10×3).

Figure 12:
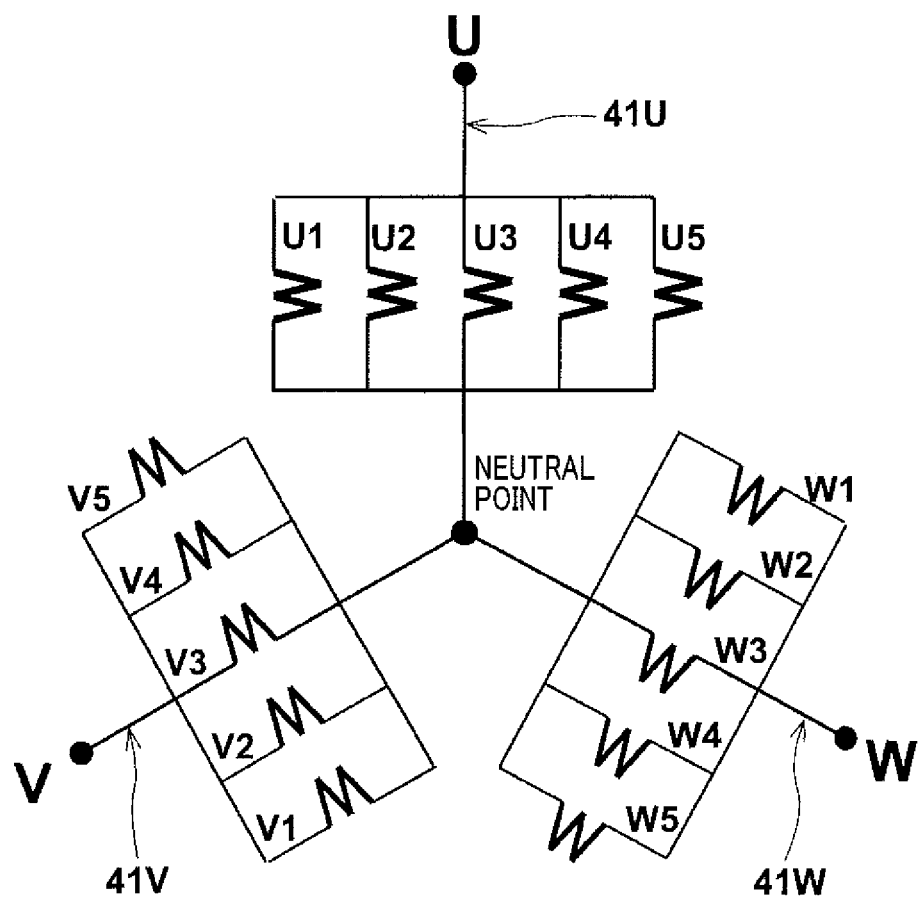
FIG. 12 is a schematic circuit diagram of the stator coil.

The U-phase, V-phase and W-phase windings 41U, 41V and 41W of the stator coil 40 are star-connected (or Y-connected) with each other (see FIG. 12). Each of the U-phase, V-phase and W-phase windings 41U, 41V and 41W includes a plurality of in-slot portions 51C and a plurality of turn portions 52A and 52B. Each of the in-slot portions 51C is received in one of the slots 31 of the stator core 30. Each of the turn portions 52A and 52B is located outside the slots 31 of the stator core 30 and connects one pair of the in-slot portions 51C respectively received in two different ones of the slots 31.

In the present embodiment, the stator coil 40 is formed by: (1) inserting a plurality of substantially U-shaped electric conductor segments 50 into the slots 31 of the stator core 30 from a first axial side (i.e., the upper side in FIG. 2) of the stator core 30; (2) twisting free end parts of each of the electric conductor segments 50, which protrude outside the slots 31 of the stator core 30 on a second axial side (i.e., the lower side in FIG. 2) of the stator core 30, respectively toward opposite circumferential sides; and (3) joining each corresponding pair of distal ends of the twisted free end parts of all the electric conductor segments 50 by, for example, welding. Consequently, all the electric conductor segments 50 are electrically connected in a predetermined pattern, forming the stator coil 40.

Figure 4:
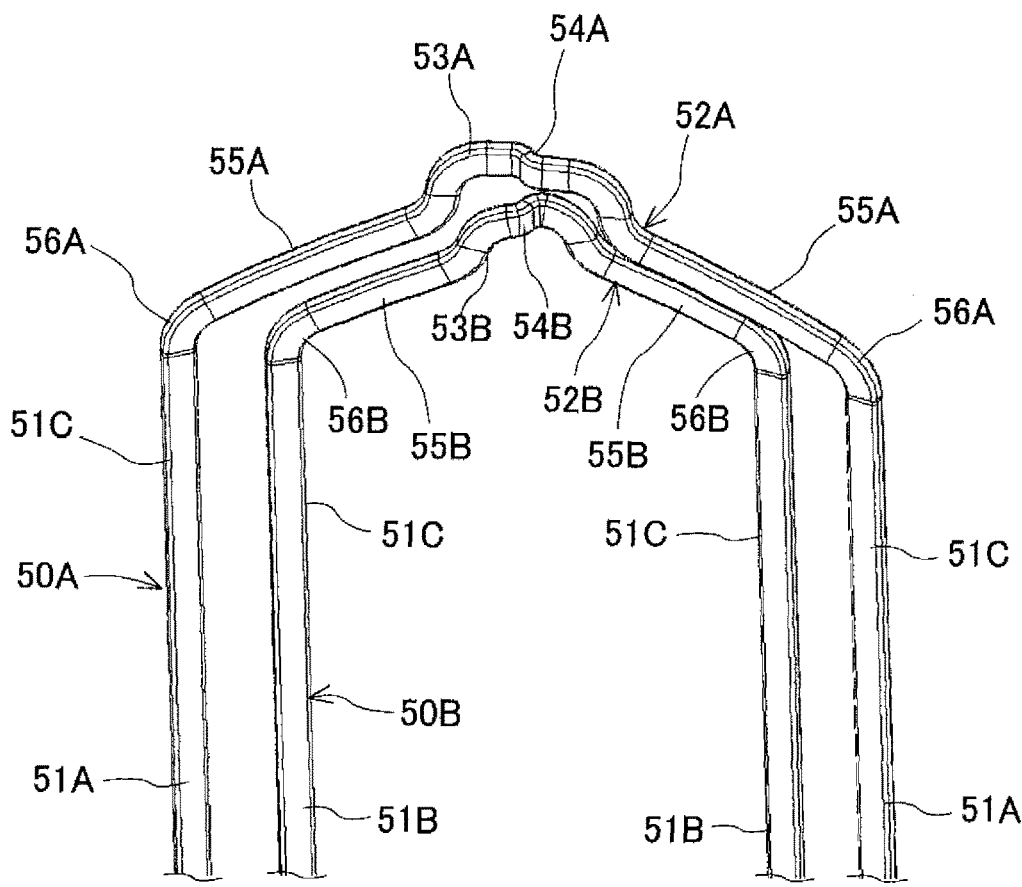
FIG. 4 is a perspective view of a pair of large and small electric conductor segments used for forming the stator coil.

Furthermore, in the present embodiment, as shown in FIG. 4, the electric conductor segments 50 forming the stator coil 40 are comprised of a plurality of large electric conductor segments 50A and a plurality of small electric conductor segments 50B that have a smaller size than the large electric conductor segments 50A. The large and small electric conductor segments 50A and 50B are formed by press-shaping an electric conductor wire, which has a substantially rectangular cross section, into the substantially U-shape using shaping dies. It should be noted that the shaping dies used for forming the large electric conductor segments 50A are different from those used for forming the small electric conductor segments 50B.

Each of the large electric conductor segments 50A has a pair of straight portions 51A extending parallel to each other and a turn portion 52A that connects ends of the straight portions 51A on the same side. On the other hand, each of the small electric conductor segments 50B has a pair of straight portions 51B extending parallel to each other and a turn portion 52B that connects ends of the straight portions 51B on the same side. The turn portions 52B of the small electric conductor segments 50B have a smaller length than the turn portions 52A of the large electric conductor segments 50A.

More specifically, in the present embodiment, the turn portions 52A of the large electric conductor segments 50A are formed to have a circumferential length of seven slot-pitches. On the other hand, the turn portions 52B of the small electric conductor segments 50B are formed to have a circumferential length of five slot-pitches. Consequently, it becomes possible to arrange the large and small electric conductor segments 50A and 50B so that each of the turn portions 52A of the large electric conductor segments 50A is located axially outside and overlaps one of the turn portions 52B of the small electric conductor segments 50B. Accordingly, the turn portions 52A of the large electric conductor segments 50A may be referred to as outer turn portions 52A; the turn portions 52B of the small electric conductor segments 50B may be referred to as inner turn portions 52B.

Moreover, each of the turn portions 52A of the large electric conductor segments 50A includes an apex part 53A that is positioned at the center of the turn portion 52A in the extending direction of the turn portion 52A (or in the circumferential direction of the stator core 30) and furthest in the turn portion 52A from a first axial end face 30a of the stator core 30; the first axial end face 30a is on the first axial side of the stator core 30. The apex part 53A extends in the circumferential direction of the stator core 30 and parallel to the first axial end face 30a of the stator core 30. Further, at the circumferential center of the apex part 53A, there is formed, by press-shaping, a crank-shaped part 54A that is bent to radially offset the apex part 53A. The amount of radial offset realized by the crank-shaped part 54A is set to be substantially equal to the radial thickness of the large and small electric conductor segments 50A and 50B. Similarly, each of the turn portions 52B of the small electric conductor segments 50B includes an apex part 53B that is positioned at the center of the turn portion 52B in the extending direction of the turn portion 52B (or in the circumferential direction of the stator core 30) and furthest in the turn portion 52B from the first axial end face 30a of the stator core 30. The apex part 53B extends in the circumferential direction of the stator core 30 and parallel to the first axial end face 30a of the stator core 30. Further, at the circumferential center of the apex part 53B, there is formed, by press-shaping, a crank-shaped part 54B that is bent to radially offset the apex part 53B. The amount of radial offset realized by the crank-shaped part 54B is also set to be substantially equal to the radial thickness of the large and small electric conductor segments 50A and 50B.

Figure 5:
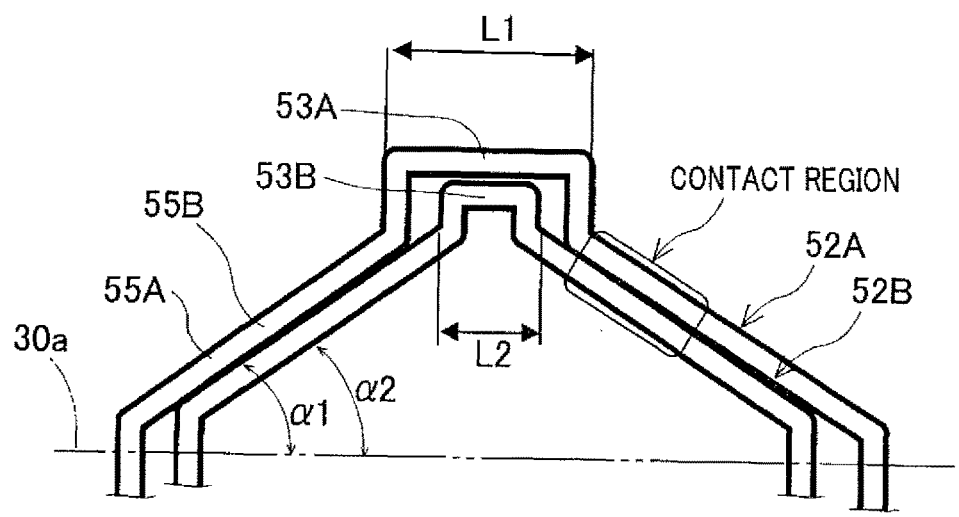
FIG. 5 is a schematic front view of part of the pair of large and small electric conductor segments.

In the present embodiment, as shown in FIG. 5, the circumferential length L1 of each of the outer apex parts 53A (i.e., the apex parts 53A of the turn portions 52A of the large electric conductor segments 50A) is set to be greater than the circumferential length L2 of each of the inner apex parts 53B (i.e., the apex parts 53B of the turn portions 52B of the small electric conductor segments 50B) by a predetermined amount. In addition, the outer apex parts 53A are located axially outside the inner apex parts 53B.

Figure 8:
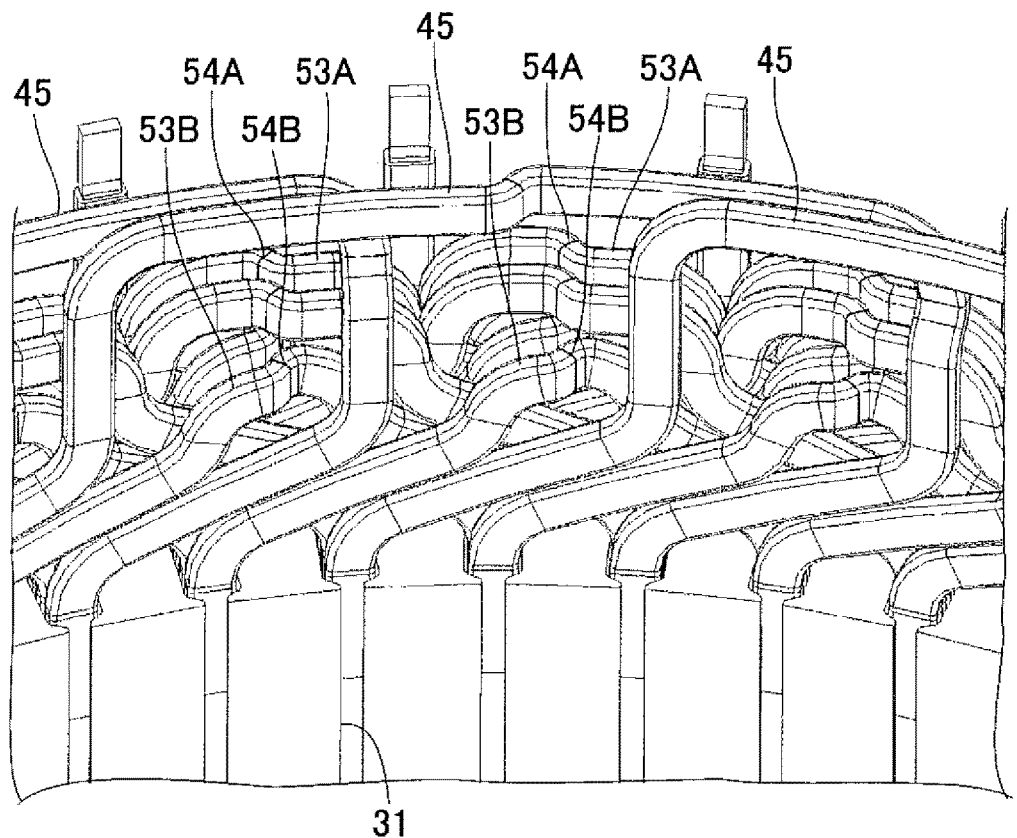
FIG. 8 is a perspective view showing part of the first coil end part of the stator coil.

Moreover, in the present embodiment, as shown in FIGS. 4 and 8, the bending direction of the crank-shaped parts 54A formed in the outer apex parts 53A is opposite to the bending direction of the crank-shaped parts 54B formed in the inner apex parts 53B.

More specifically, in FIG. 8, for each of the outer apex parts 53A, the crank-shaped part 54A formed in the outer apex part 53A is bent from a right end portion of the outer apex part 53A radially outward (i.e., in a direction into the paper plane of FIG. 8), so that a left end portion of the outer apex part 53A is located radially outside the right end portion. In contrast, for each of the inner apex parts 53B, the crank-shaped part 54B formed in the inner apex part 53B is bent from a right end portion of the inner apex part 53B radially inward (i.e., in a direction out of the paper plane of FIG. 8), so that a left end portion of the inner apex part 53B is located radially inside the right end portion.

Consequently, for each of the outer apex parts 53A, the left end portion of the outer apex part 53A is offset, by the crank-shaped part 54A formed in the outer apex part 53A, from the right end portion of the outer apex part 53A radially outward (i.e., in the direction into the paper plane of FIG. 8). In contrast, for each of the inner apex parts 53B, the left end portion of the inner apex part 53B is offset, by the crank-shaped part 54B formed in the inner apex part 53B, from the right end portion of the inner apex part 53B radially inward (i.e., in the direction out of the paper plane of FIG. 8).

That is, in the present embodiment, the direction of radial offset of the outer apex parts 53A by the respective crank-shaped parts 54A is opposite to the direction of radial offset of the inner apex parts 53B by the respective crank-shaped parts 54B.

Figure 9:
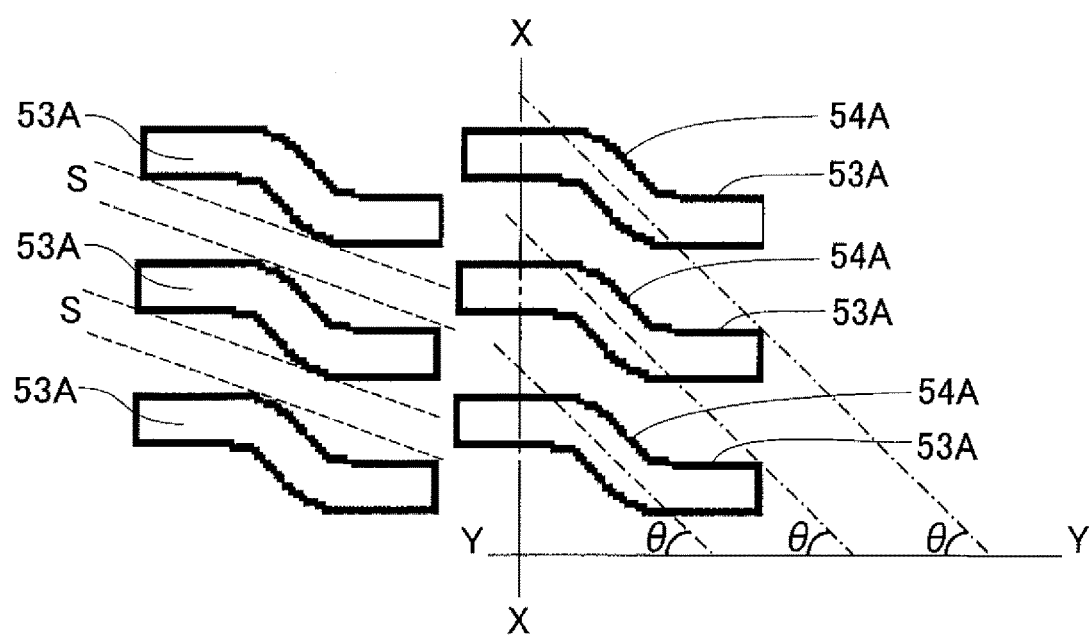
FIG. 9 is a schematic view illustrating the arrangement of apex parts of turn portions of the large electric conductor segments in the first coil end part of the stator coil.
Figure 10:
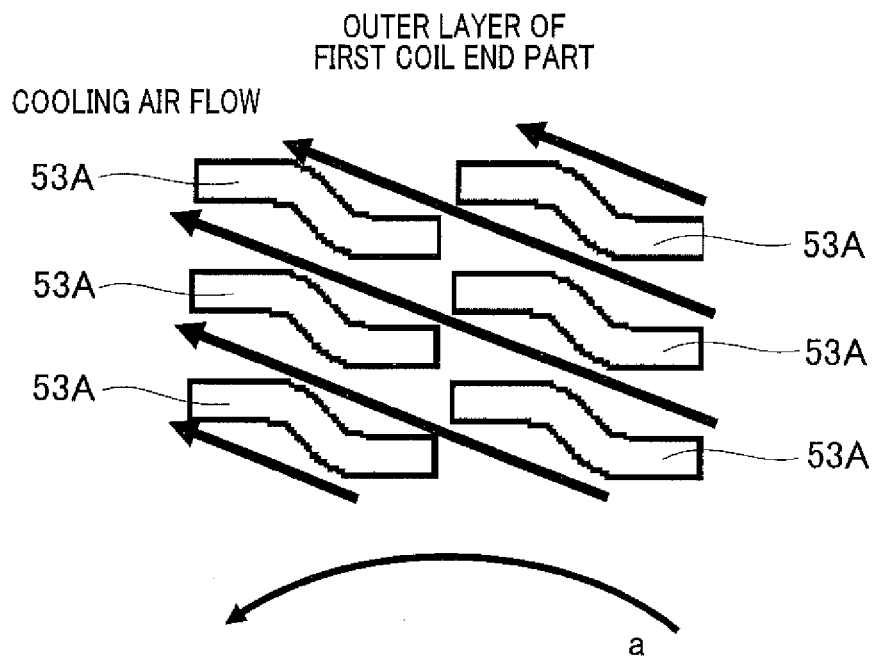
FIG. 10 is a schematic view illustrating the cooling air flow through the apex parts of the turn portions of the large electric conductor segments in the first coil end part of the stator coil.
Figure 11:
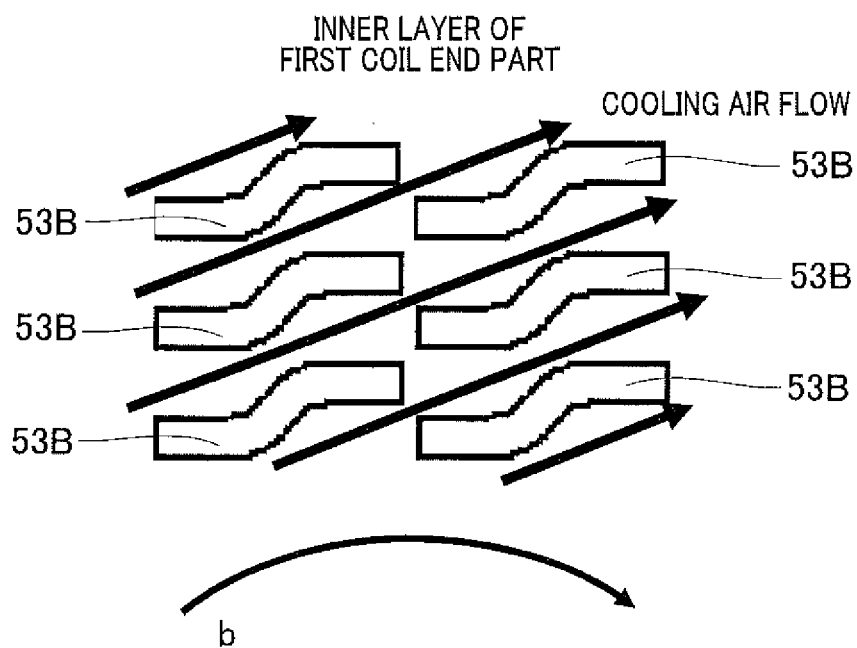
FIG. 11 is a schematic view illustrating the cooling air flow through apex parts of turn portions of the small electric conductor segments in the first coil end part of the stator coil.

Moreover, in the present embodiment, as shown in FIGS. 9-11, all of the inclination angles θ of the crank-shaped parts 54A and 54B formed in the respective outer and inner apex parts 53A and 53B to the circumferential direction of the stator core 30 are set to be equal to each other.

Furthermore, referring back to FIGS. 4 and 5, each of the turn portions 52A of the large electric conductor segments 50A also includes a pair of oblique parts 55A that are respectively formed on opposite circumferential sides of the apex part 53A so as to extend obliquely with respect to the first axial end face 30a of the stator core 30 at a first predetermined oblique angle α1. Each of the turn portions 52A of the large electric conductor segments 50A further includes a pair of bent parts 56A. Each of the bent parts 56A is formed, by press-shaping using shaping dies, between one of the oblique parts 55A and one of the straight portions 51A connected by the turn portion 52A. The bent parts 56A protrude from the first axial end face 30a of the stator core 30. Similarly, each of the turn portions 52B of the small electric conductor segments 50B also includes a pair of oblique parts 55B that are respectively formed on opposite circumferential sides of the apex part 53B so as to extend obliquely with respect to the first axial end face 30a of the stator core 30 at a second predetermined oblique angle α2. Each of the turn portions 52B of the small electric conductor segments 50B further includes a pair of bent parts 56B. Each of the bent parts 56B is formed, by press-shaping using shaping dies, between one of the oblique parts 55B and one of the straight portions 51B connected by the turn portion 52B. The bent parts 56B protrude from the first axial end face 30a of the stator core 30. In addition, in the present embodiment, the first predetermined oblique angle α1 and the second predetermined oblique angle α2 are set to be equal to each other (see FIG. 5).

Figure 6:
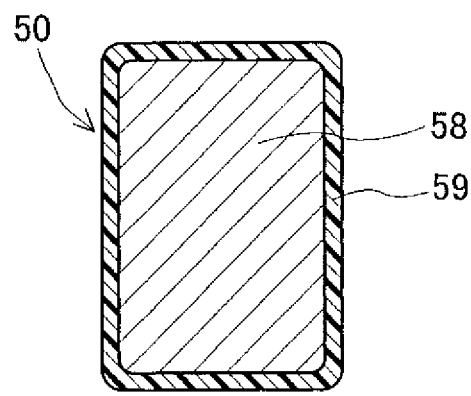
FIG. 6 is a cross-sectional view illustrating the configuration of the electric conductor segments used for forming the stator coil.

In the present embodiment, as shown in FIG. 6, each of the large and small electric conductor segments 50A and 50B is configured with an electric conductor 58 and an insulating coat 59 that covers the outer surface of the electric conductor 58. The electric conductor 58 is made, for example, of an electrically-conductive metal (e.g., copper) and has a substantially rectangular cross section. The insulating coat 59 is made, for example, of an electrically-insulative resin.

Figure 7:
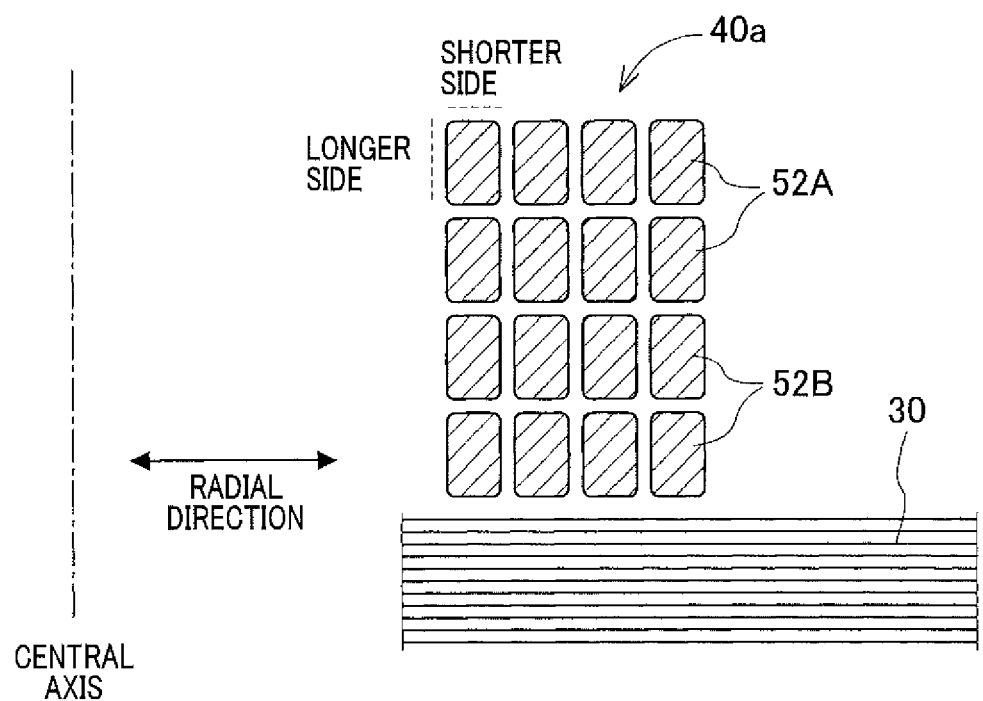
FIG. 7 is a schematic cross-sectional view illustrating the arrangement of the electric conductor segments in the first coil end part of the stator coil.

Moreover, in the present embodiment, as shown in FIG. 7, each of the large and small electric conductor segments 50A and 50B forming the stator coil 40 is arranged so that a pair of side faces of the electric conductor segment, which correspond to the longer sides of the substantially rectangular cross section of the electric conductor segment, face in the radial direction of the stator core 30.

Referring back to FIG. 2, the stator coil 40 has an annular first coil end part 40a on the first axial side (i.e., the upper side in FIG. 2) of the stator core 30 and an annular second coil end part 40b on the second axial side (i.e., the lower side in FIG. 2) of the stator core 30. The first coil end part 40a is constituted of the turn portions 52A and 52B of the large and small electric conductor segments 50A and 50B which protrude from the first axial end face 30a of the stator core 30. The second coil end part 40b is constituted of the twisted free end parts of the large and small electric conductor segments 50A and 50B which protrude from the second axial end face 30a of the stator core 30.

In the present embodiment, as shown in FIG. 8, the first coil end part 40a of the stator coil 40 has a two-layer structure such that for each circumferentially-adjacent pair of the turn portions 52A of the large electric conductor segments 50A and the turn portions 52B of the small electric conductor segments 50B, the apex parts 53A and 53B of the pair of the turn portions 52A and 52B axially overlap each other. That is, the turn portions 52A of the large electric conductor segments 50A, which are located on the axially outer side, together form an outer layer of the first coil end part 40a of the stator coil 40; the turn portions 52B of the small electric conductor segments 50B, which are located on the axially inner side, together constitute an inner layer of the first coil end part 40a. In addition, as described previously, the bending direction of the crank-shaped parts 54A formed in the apex parts 53A of the turn portions 52A of the large electric conductor segments 50A is opposite to the bending direction of the crank-shaped parts 54B formed in the apex parts 53B of the turn portions 52B of the small electric conductor segments 50B.

Moreover, as shown in FIG. 9, with all of the inclination angles θ of the crank-shaped parts 54A set to be equal to each other, each radially-facing pair of the crank-shaped parts 54A formed in the respective outer apex parts 53A extend parallel to each other keeping a radial space S therebetween. Further, for each of the outer apex parts 53A, the crank-shaped part 54A formed in the outer apex part 53A is inclined, at the inclination angle θ to an imaginary line Y which is perpendicular to a radially-extending imaginary line X, so that one circumferential end (i.e., the left end in FIG. 9) of the crank-shaped part 54A is located radially outward (i.e., upward in FIG. 9) of the other circumferential end (i.e., the right end in FIG. 9) of the crank-shaped part 54A. Consequently, as shown in FIG. 10, during rotation of the rotor 14 in a counterclockwise direction as indicated by an arrow a in FIG. 10, cooling air will flow from the radially inside to the radially outside of the first coil end part 40a of the stator coil 40 through the spaces formed between radially-facing pairs of the outer apex parts 53A in the outer layer of the first coil end part 40a. As a result, it is possible to secure the cooling performance of the rotating electric machine 1 when the rotor 14 rotates in the counterclockwise direction a.

Similarly, though not shown in the figures, with all of the inclination angles θ of the crank-shaped parts 54B set to be equal to each other, each radially-facing pair of the crank-shaped parts 54B formed in the respective inner apex parts 53B extend parallel to each other keeping a radial space S therebetween. However, the bending direction of the crank-shaped parts 54B formed in the respective inner apex parts 53B is opposite to the bending direction of the crank-shaped parts 54A formed in the respective outer apex parts 53A. Consequently, as shown in FIG. 11, during rotation of the rotor 14 in a clockwise direction as indicated by an arrow b in FIG. 11, cooling air will flow from the radially inside to the radially outside of the first coil end part 40a of the stator coil 40 through the spaces formed between radially-facing pairs of the inner apex parts 53B in the inner layer of the first coil end part 40a. As a result, it is also possible to secure the cooling performance of the rotating electric machine 1 when the rotor 14 rotates in the clockwise direction b.

In the present embodiment, as shown in FIG. 12, the U-phase, V-phase and W-phase windings 41U, 41V and 41W of the stator coil 40, which are star-connected with each other, are each comprised of five sub-windings. That is, the U-phase winding 41U is comprised of sub-windings U1, U2, U3, U4 and U5 that are connected parallel to each other; the V-phase winding 41V is comprised of sub-windings V1, V2, V3, V4 and V5 that are connected parallel to each other; and the W-phase winding 41W is comprised of sub-windings W1, W2, W3, W4 and W5 that are connected parallel to each other.

Moreover, in the present embodiment, the U-phase, V-phase and W-phase windings 41U, 41V and 41W of the stator coil 40 are arranged in the slots 31 of the stator core 30 in the same manner. Therefore, for the sake of avoiding redundancy, only the arrangement of the U-phase winding 41U in the slots 31 of the stator core 30 will be described hereinafter with reference to FIGS. 13-20.

Figure 13:
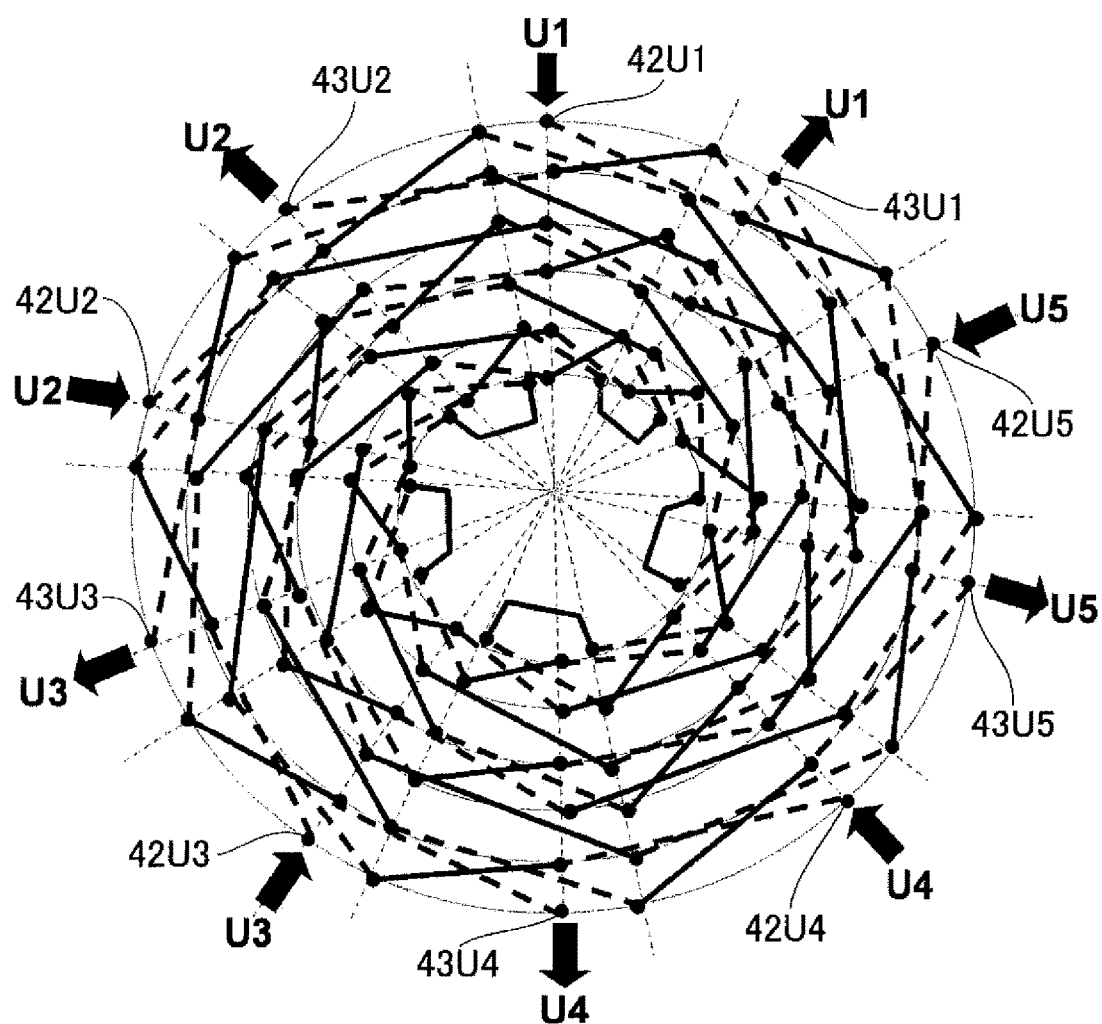
FIG. 13 is a schematic view illustrating the arrangement of a U-phase winding of the stator coil.
Figure 18:
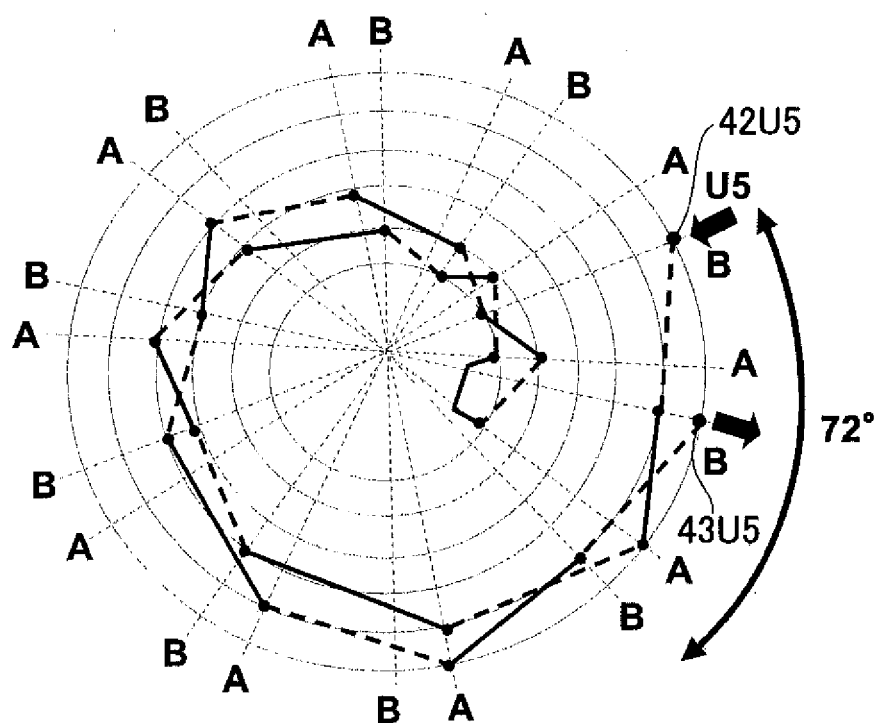
FIG. 18 is a schematic view illustrating only the arrangement of a fifth sub-winding U5 of the U-phase winding.

FIG. 13 illustrates, among the three phase windings 41U-41W of the stator coil 40, only the U-phase winding 41U arranged in the slots 31 of the stator core 30. FIG. 14 illustrates, among the five sub-windings U1-U5 of the U-phase winding 41U, only the first sub-winding U1 arranged in the slots 31 of the stator core 30. FIG. 15 illustrates, among the five sub-windings U1-U5 of the U-phase winding 41U, only the second sub-winding U2 arranged in the slots 31 of the stator core 30. FIG. 16 illustrates, among the five sub-windings U1-U5 of the U-phase winding 41U, only the third sub-winding U3 arranged in the slots 31 of the stator core 30. FIG. 17 illustrates, among the five sub-windings U1-U5 of the U-phase winding 41U, only the fourth sub-winding U4 arranged in the slots 31 of the stator core 30. FIG. 18 illustrates, among the five sub-windings U1-U5 of the U-phase winding 41U, only the fifth sub-winding U5 arranged in the slots 31 of the stator core 30.

In the present embodiment, as mentioned previously, the number of the magnetic poles formed in the rotor 14 by the permanent magnets is equal to 10. Moreover, during operation of the rotating electric machine 1, magnetic flux, which is generated by the rotor 14 and passes through the stator 20, forms a plurality of magnetic poles in the stator 20. The number of the magnetic poles formed in the stator 20 is also equal to 10, corresponding to the number of the magnetic poles of the rotor 14. That is, the number of the magnetic poles formed in the stator 20 is a multiple of the number of sub-windings of the U-phase winding 41U, more specifically the least common multiple of 2 and the number of sub-windings of the U-phase winding 41U (i.e., 2×5=10).

In FIGS. 13-18, let the magnetic pole located at twelve o'clock be the first pole and the remaining magnetic poles respectively be the second to the tenth poles counting in the clockwise direction. Moreover, in FIGS. 13-18, the electrical connection between the in-slot portions 51C of the U-phase winding 41U on the first coil end part 40a side (i.e., on the first axial side of the stator core 30) are shown with continuous lines while the electrical connection between the in-slot portions 51C of the U-phase winding 41U on the second coil end part 40b side (i.e., on the second axial side of the stator core 30) are shown with dashed lines.

In the present embodiment, the in-slot portions 51C of the U-phase winding 41C are received in ten pairs of the slots 31 of the stator core 30. Hereinafter, for the sake of convenience of explanation, these ten pairs of the slots 31 will be referred to as ten pairs of U-phase slots A and B. For each of the ten pairs, the two U-phase slots A and B of the pair are circumferentially adjacent to each other. Moreover, since the slot multiplier number M is set to 2, the ten pairs of the U-phase slots A and B are circumferentially spaced at six slot-pitches. That is, the U-phase slots A are circumferentially spaced from one another at six slot-pitches; the U-phase slots B are circumferentially spaced from one another at six slot-pitches.

Furthermore, in the present embodiment, in each of the U-phase slots A and B, there are received six of the in-slot portions 51C of the U-phase winding 41U in radial alignment with each other (see FIG. 13). In other words, in each of the U-phase slots A and B, there are received the in-slot portions 51C of the U-phase winding 41U in six layers. Hereinafter, the six layers will be sequentially referred to as the first, second, fifth and sixth layers from the radially inner side to the radially outer side. In addition, for each of the sub-windings U1-U5 of the U-phase winding 41U, the in-slot portions 51C of the sub-winding will be sequentially referred to as the first, second, . . . , 23rd and 24th in-slot portions from the winding start side to the winding finish side.

First, referring to FIG. 14, the arrangement of the 24 in-slot portions of the first sub-winding U1 of the U-phase winding 41U in the ten pairs of the U-phase slots A and B will be described.

The first in-slot portion of the sub-winding U1 is arranged at the sixth layer in the U-phase slot B of the first pole. The second in-slot portion of the sub-winding U1 is arranged at the fifth layer in the U-phase slot B of the second pole; the U-phase slot B of the second pole is away from the U-phase slot B of the first pole by six slot-pitches in the clockwise direction. In addition, a winding start-side end of the first in-slot portion is extended to the first coil end part 40a side (i.e., the front side of FIG. 14), forming an input-side lead wire 42U1 of the sub-winding U1.

The third in-slot portion of the sub-winding U1 is arranged at the sixth layer in the U-phase slot A of the third pole; the U-phase slot A of the third pole is away from the U-phase slot B of the second pole by five slot-pitches in the clockwise direction. The fourth in-slot portion of the sub-winding U1 is arranged at the fifth layer in the U-phase slot A of the fourth pole; the U-phase slot A of the fourth pole is away from the U-phase slot A of the third pole by six slot-pitches in the clockwise direction.

The fifth in-slot portion of the sub-winding U1 is arranged at the fourth layer in the U-phase slot B of the fifth pole; the U-phase slot B of the fifth pole is away from the U-phase slot A of the fourth pole by seven slot-pitches in the clockwise direction. The sixth in-slot portion of the sub-winding U1 is arranged at the third layer in the U-phase slot B of the sixth pole; the U-phase slot B of the sixth pole is away from the U-phase slot B of the fifth pole by six slot-pitches in the clockwise direction.

The seventh in-slot portion of the sub-winding U1 is arranged at the fourth layer in the U-phase slot A of the seventh pole; the U-phase slot A of the seventh pole is away from the U-phase slot B of the sixth pole by five slot-pitches in the clockwise direction. The eighth in-slot portion of the sub-winding U1 is arranged at the third layer in the U-phase slot A of the eighth pole; the U-phase slot A of the eighth pole is away from the U-phase slot A of the seventh pole by six slot-pitches in the clockwise direction.

The ninth in-slot portion of the sub-winding U1 is arranged at the second layer in the U-phase slot B of the ninth pole; the U-phase slot B of the ninth pole is away from the U-phase slot A of the eighth pole by seven slot-pitches in the clockwise direction. The tenth in-slot portion of the sub-winding U1 is arranged at the first layer in the U-phase slot B of the tenth pole; the U-phase slot B of the tenth pole is away from the U-phase slot B of the ninth pole by six slot-pitches in the clockwise direction.

The eleventh in-slot portion of the sub-winding U1 is arranged at the second layer in the U-phase slot A of the first pole; the U-phase slot A of the first pole is away from the U-phase slot B of the tenth pole by five slot-pitches in the clockwise direction. The twelfth in-slot portion of the sub-winding U1 is arranged at the first layer in the U-phase slot A of the second pole; the U-phase slot A of the second pole is away from the U-phase slot A of the first pole by six slot-pitches in the clockwise direction.

The thirteenth in-slot portion of the sub-winding U1 is arranged at the first layer in the U-phase slot A of the third pole; the U-phase slot A of the third pole is away from the U-phase slot A of the second pole by six slot-pitches in the clockwise direction. In addition, the thirteenth in-slot portion of the sub-winding U1 is connected with the twelfth in-slot portion of the sub-winding U1 via a bridging wire 45 (see FIG. 8) on the first coil end part 40a side. The fourteenth in-slot portion of the sub-winding U1 is arranged at the second layer in the U-phase slot A of the second pole; the U-phase slot A of the second pole is away from the U-phase slot A of the third pole by six slot-pitches in the counterclockwise direction. That is, from the fourteenth in-slot portion, the sub-winding U1 starts to be wound back in the counterclockwise direction.

The fifteenth in-slot portion of the sub-winding U1 is arranged at the first layer in the U-phase slot B of the first pole; the U-phase slot B of the first pole is away from the U-phase slot A of the second pole by five slot-pitches in the counterclockwise direction. The sixteenth in-slot portion of the sub-winding U1 is arranged at the second layer in the U-phase slot B of the tenth pole; the U-phase slot B of the tenth pole is away from the U-phase slot B of the first pole by six slot-pitches in the counterclockwise direction.

The seventeenth in-slot portion of the sub-winding U1 is arranged at the third layer in the U-phase slot A of the ninth pole; the U-phase slot A of the ninth pole is away from the U-phase slot B of the tenth pole by seven slot-pitches in the counterclockwise direction. The eighteenth in-slot portion of the sub-winding U1 is arranged at the fourth layer in the U-phase slot A of the eighth pole; the U-phase slot A of the eighth pole is away from the U-phase slot A of the ninth pole by six slot-pitches in the counterclockwise direction.

The nineteenth in-slot portion of the sub-winding U1 is arranged at the third layer in the U-phase slot B of the seventh pole; the U-phase slot B of the seventh pole is away from the U-phase slot A of the eighth pole by five slot-pitches in the counterclockwise direction. The twentieth in-slot portion of the sub-winding U1 is arranged at the fourth layer in the U-phase slot B of the sixth pole; the U-phase slot B of the sixth pole is away from the U-phase slot B of the seventh pole by six slot-pitches in the counterclockwise direction.

The 21st in-slot portion of the sub-winding U1 is arranged at the fifth layer in the U-phase slot A of the fifth pole; the U-phase slot A of the fifth pole is away from the U-phase slot B of the sixth pole by seven slot-pitches in the counterclockwise direction. The 22nd in-slot portion of the sub-winding U1 is arranged at the sixth layer in the U-phase slot A of the fourth pole; the U-phase slot A of the fourth pole is away from the U-phase slot A of the fifth pole by six slot-pitches in the counterclockwise direction.

The 23rd in-slot portion of the sub-winding U1 is arranged at the fifth layer in the U-phase slot B of the third pole; the U-phase slot B of the third pole is away from the U-phase slot A of the fourth pole by five slot-pitches in the counterclockwise direction. The 24th in-slot portion of the sub-winding U1 is arranged at the sixth layer in the U-phase slot B of the second pole; the U-phase slot B of the second pole is away from the U-phase slot B of the third pole by six slot-pitches in the counterclockwise direction. In addition, a winding finish-side end of the 24th in-slot portion is extended to the first coil end part 40*a* side (i.e., the front side of FIG. 14), forming a neutral point-side lead wire 43U1 of the sub-winding U1.

The sub-winding U1 is wound on the stator core 30 so that the first to the 24th in-slot portions of the sub-winding U1 are received in the ten pairs of the U-phase slots A and B of the stator core 30 as described above. Moreover, as shown with the continuous lines in FIG. 14, on the first axial side of the stator core 30, the in-slot portions of the sub-winding U1 are connected by the outer turn portions 52A of the sub-winding U1 (i.e., the turn portions 52A of the large electric conductor segments 50A forming the sub-winding U1) and the inner turn portions 52B of the sub-winding U1 (i.e., the turn portions 52B of the small electric conductor segments 50B forming the sub-winding U1). The outer turn portions 52A of the sub-winding U1 are arranged alternately with the inner turn portions 52B of the sub-winding U1 in the circumferential direction of the stator core 30; the outer turn portions 52A have the circumferential length of seven slot-pitches while the inner turn portions 52B have the circumferential length of five slot-pitches. On the other hand, as shown with the dashed lines in FIG. 14, on the second axial side of the stator core 30, the in-slot portions of the sub-winding U1 are connected by connection portions of the sub-winding U1. Each of the connection portions is constituted of one joined-pair of the twisted free end parts of the large and small electric conductor segments 50A and 50B forming the sub-winding U1, and has a circumferential length of six slot-pitches.

Next, referring to FIG. 15, the arrangement of the 24 in-slot portions of the second sub-winding U2 of the U-phase winding 41U in the ten pairs of the U-phase slots A and B will be described.

The first in-slot portion of the sub-winding U2 is arranged at the sixth layer in the U-phase slot B of the ninth pole. The second in-slot portion of the sub-winding U2 is arranged at the fifth layer in the U-phase slot B of the tenth pole; the U-phase slot B of the tenth pole is away from the U-phase slot B of the ninth pole by six slot-pitches in the clockwise direction.

That is, the first and second in-slot portions of the sub-winding U2 are respectively offset from the first and second in-slot portions of the sub-winding U1 by an offset angle of 72° in the counterclockwise direction. Here, the offset angle of 72° is equal to the quotient of 360° divided by the number of the sub-windings of the U-phase winding 41U (i.e., 5 in the present embodiment).

Moreover, the third to the 24th in-slot portions of the sub-winding U2 are arranged in the U-phase slots A and B of the stator core 30 so as to be respectively offset from the third to the 24th in-slot portions of the sub-winding U1 by the offset angle of 72° in the counterclockwise direction.

In addition, both a winding start-side end of the first in-slot portion of the sub-winding U2 and a winding finish-side end of the 24th in-slot portion of the sub-winding U2 are extended to the first coil end part 40*a* side (i.e., the front side of FIG. 15), respectively forming an input-side lead wire 42U2 and a neutral point-side lead wire 43U2 of the sub-winding U2.

Next, referring to FIG. 16, the arrangement of the 24 in-slot portions of the third sub-winding U3 of the U-phase winding 41U in the ten pairs of the U-phase slots A and B will be described.

The first in-slot portion of the sub-winding U3 is arranged at the sixth layer in the U-phase slot B of the seventh pole. The second in-slot portion of the sub-winding U3 is arranged at the fifth layer in the U-phase slot B of the eighth pole; the U-phase slot B of the eighth pole is away from the U-phase slot B of the seventh pole by six slot-pitches in the clockwise direction.

That is, the first and second in-slot portions of the sub-winding U3 are respectively offset from the first and second in-slot portions of the sub-winding U2 by the offset angle of 72° in the counterclockwise direction.

Moreover, the third to the 24th in-slot portions of the sub-winding U3 are arranged in the U-phase slots A and B of the stator core 30 so as to be respectively offset from the third to the 24th in-slot portions of the sub-winding U2 by the offset angle of 72° in the counterclockwise direction.

In addition, both a winding start-side end of the first in-slot portion of the sub-winding U3 and a winding finish-side end of the 24th in-slot portion of the sub-winding U3 are extended to the first coil end part 40*a* side (i.e., the front side of FIG. 16), respectively forming an input-side lead wire 42U3 and a neutral point-side lead wire 43U3 of the sub-winding U3.

Next, referring to FIG. 17, the arrangement of the 24 in-slot portions of the fourth sub-winding U4 of the U-phase winding 41U in the ten pairs of the U-phase slots A and B will be described.

The first in-slot portion of the sub-winding U4 is arranged at the sixth layer in the U-phase slot B of the fifth pole. The second in-slot portion of the sub-winding U4 is arranged at the fifth layer in the U-phase slot B of the sixth pole; the U-phase slot B of the sixth pole is away from the U-phase slot B of the fifth pole by six slot-pitches in the clockwise direction.

That is, the first and second in-slot portions of the sub-winding U4 are respectively offset from the first and second in-slot portions of the sub-winding U3 by the offset angle of 72° in the counterclockwise direction.

Moreover, the third to the 24th in-slot portions of the sub-winding U4 are arranged in the U-phase slots A and B of the stator core 30 so as to be respectively offset from the third to the 24th in-slot portions of the sub-winding U3 by the offset angle of 72° in the counterclockwise direction.

In addition, both a winding start-side end of the first in-slot portion of the sub-winding U4 and a winding finish-side end of the 24th in-slot portion of the sub-winding U4 are extended to the first coil end part 40a side (i.e., the front side of FIG. 17), respectively forming an input-side lead wire 42U4 and a neutral point-side lead wire 43U4 of the sub-winding U4.

Next, referring to FIG. 18, the arrangement of the 24 in-slot portions of the fifth sub-winding U5 of the U-phase winding 41U in the ten pairs of the U-phase slots A and B will be described.

The first in-slot portion of the sub-winding U5 is arranged at the sixth layer in the U-phase slot B of the third pole. The second in-slot portion of the sub-winding U5 is arranged at the fifth layer in the U-phase slot B of the fourth pole; the U-phase slot B of the fourth pole is away from the U-phase slot B of the third pole by six slot-pitches in the clockwise direction.

That is, the first and second in-slot portions of the sub-winding U5 are respectively offset from the first and second in-slot portions of the sub-winding U4 by the offset angle of 72° in the counterclockwise direction.

Moreover, the third to the 24th in-slot portions of the sub-winding U5 are arranged in the U-phase slots A and B of the stator core 30 so as to be respectively offset from the third to the 24th in-slot portions of the sub-winding U4 by the offset angle of 72° in the counterclockwise direction.

In addition, both a winding start-side end of the first in-slot portion of the sub-winding U5 and a winding finish-side end of the 24th in-slot portion of the sub-winding U5 are extended to the first coil end part 40a side (i.e., the front side of FIG. 18), respectively forming an input-side lead wire 42U5 and a neutral point-side lead wire 43U5 of the sub-winding U5.

As described above, in the present embodiment, the sub-windings U1-U5 of the U-phase winding 41U are arranged with rotational symmetry so as to be circumferentially offset from one another by the offset angle of 72°; the offset angle of 72° is equal to the quotient of 360° divided by the number of the sub-windings of the U-phase winding 41U (i.e., equal to 360°/5). Moreover, in each of the U-phase slots A and B, there are arranged six of the in-slot portions 51C of the U-phase winding 41U in six layers so as to be radially aligned with each other. Furthermore, for each of the sub-windings U1-U5 of the U-phase winding 41U, the in-slot portion 51C of the sub-winding which is arranged at the Nth layer in one of the U-phase slots A and B is electrically connected with the in-slot portion 51C of the sub-winding which is arranged at the (N+1)th layer in another one of the U-phase slots A and B, where N is an arbitrary natural number greater than or equal to 1 and less than 6.

Figure 19:
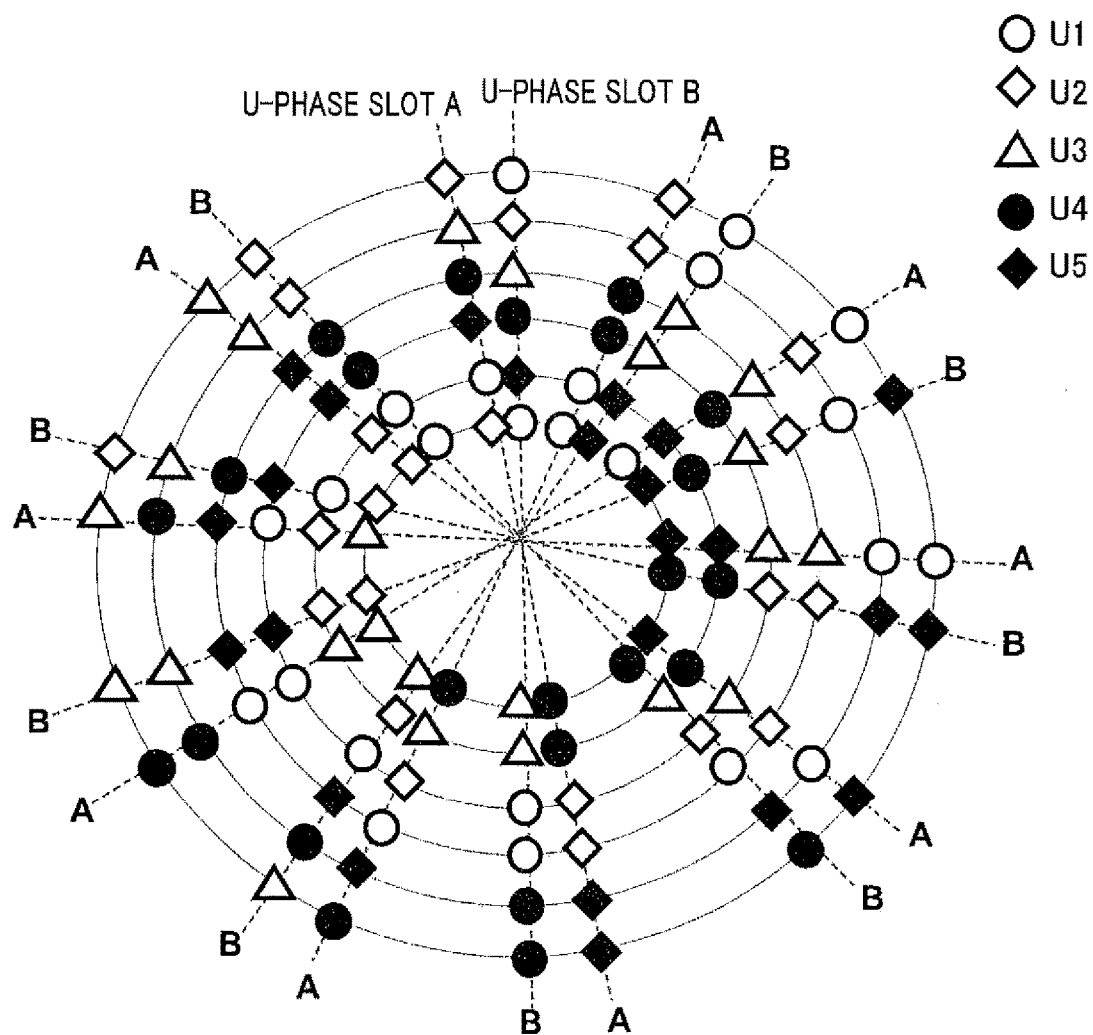
FIG. 19 is a schematic view illustrating the arrangement of the sub-windings U1-U5 of the U-phase winding in pairs of U-phase slots A and B of a stator core of the stator.

Moreover, in the present embodiment, as shown in FIGS. 19 and 20, for each of the sub-windings U1-U5 of the U-phase winding 41U, the in-slot portions 51C of the sub-winding are evenly distributed to the first to the sixth layers so that at each of the first to the sixth layers, the number of the in-slot portions 51C of the sub-winding received in the U-phase slots A and B is equal to 2×M, where M is the slot multiplier number and set to 2 in the present embodiment.

More specifically, in the present embodiment, for each of the sub-windings U1-U5 of the U-phase winding 41U, the number of the in-slot portions 51C of the sub-winding arranged at the first layer in the U-phase slots A is equal to 2; the number of the in-slot portions 51C of the sub-winding arranged at the first layer in the U-phase slots B is equal to 2; thus the total number of the in-slot portions 51C of the sub-winding arranged at the first layer in the U-phase slots A and B is equal to 4 (i.e., 2×M with M being set to 2). Similarly, the number of the in-slot portions 51C of the sub-winding arranged at the second layer in the U-phase slots A is equal to 2; the number of the in-slot portions 51C of the sub-winding arranged at the second layer in the U-phase slots B is equal to 2; thus the total number of the in-slot portions 51C of the sub-winding arranged at the second layer in the U-phase slots A and B is equal to 4. The number of the in-slot portions 51C of the sub-winding arranged at the third layer in the U-phase slots A is equal to 2; the number of the in-slot portions 51C of the sub-winding arranged at the third layer in the U-phase slots B is equal to 2; thus the total number of the in-slot portions 51C of the sub-winding arranged at the third layer in the U-phase slots A and B is equal to 4. The number of the in-slot portions 51C of the sub-winding arranged at the fourth layer in the U-phase slots A is equal to 2; the number of the in-slot portions 51C of the sub-winding arranged at the fourth layer in the U-phase slots B is equal to 2; thus the total number of the in-slot portions 51C of the sub-winding arranged at the fourth layer in the U-phase slots A and B is equal to 4. The number of the in-slot portions 51C of the sub-winding arranged at the fifth layer in the U-phase slots A is equal to 2; the number of the in-slot portions 51C of the sub-winding arranged at the fifth layer in the U-phase slots B is equal to 2; thus the total number of the in-slot portions 51C of the sub-winding arranged at the fifth layer in the U-phase slots A and B is equal to 4.

Moreover, in the present embodiment, as shown in FIG. 13, at each of the first to the sixth layers, those in-slot portions 51C of the sub-windings U1-U5 of the U-phase winding 41U which are connected with the outer apex parts 53A (i.e., the apex parts 53A of the turn portions 52A of the large electric conductor segments 50A forming the sub-windings U1-U5) are arranged alternately with those in-slot portions 51C of the sub-windings U1-U5 which are connected with the inner apex parts 53B (i.e., the apex parts 53B of the turn portions 52B of the small electric conductor segments 50B forming the sub-windings U1-U5) in the circumferential direction of the stator core 30.

Referring back to FIG. 5, in the present embodiment, for each axially-overlapping pair of the outer and inner turn portions 52A and 52B, one of the outer oblique parts 55A of the outer turn portion 52A and one of the inner oblique parts 55B of the inner turn portion 52B (i.e., the right-side outer oblique part 55A and the right-side inner oblique part 55B in FIG. 5) are in contact with each other over at least parts of the circumferential lengths thereof. In addition, the remaining part of the outer turn portion 52A which is out of contact with the inner oblique part 55B of the inner turn portion 52B is in contact with one of the inner oblique parts 55B of another inner turn portion 52B (not shown).

In the present embodiment, the input-side lead wires 42U1-42U5 of the sub-windings U1-U5 of the U-phase winding 41U are electrically connected to the inverter via the U-phase busbar 61. Similarly, input-side lead wires 42V1-42V5 of the sub-windings V1-V5 of the V-phase winding 41V are electrically connected to the inverter via the V-phase busbar 62; input-side lead wires 42W1-42W5 of the sub-windings W1-W5 of the W-phase winding 41W are electrically connected to the inverter via the W-phase busbar 63. Moreover, all of the neutral point-side lead wires 43U1-43U5 of the sub-windings U1-U5 of the U-phase winding 41U, neutral point-side lead wires 43V1-43V5 of the sub-windings V1-V5 of the V-phase winding 41V and neutral point-side lead wires 43W1-43W5 of the sub-windings W1-W5 of the W-phase winding 41W are electrically connected, via the neutral busbar 64, to define the neutral point therebetween.

The above-described stator 20 according to the present embodiment has the following advantages.

In the present embodiment, the stator 20 includes the annular stator core 30 and the three-phase stator coil 40. The stator core 30 has the plurality of slots 31 arranged in the circumferential direction thereof. The stator coil 40 is comprised of the U-phase, V-phase and W-phase windings 41U, 41V and 41W that are mounted on the stator core 30 so as to be different in electrical phase from each other. The phase windings 41U-41W are star-connected with each other to define the neutral point therebetween. Each of the phase windings 41U-41W includes the plurality of in-slot portions 51C each of which is received in one of the slots 31 of the stator core 30. In each of the slots 31 of the stator core 30, there are arranged K of the in-slot portions 51C of the phase windings 41U-41W of the stator coil 40 in K layers so as to be radially aligned with each other, where K is an even number and set to 6 in the present embodiment. The number of the slots 31 formed in the stator core 30 per magnetic pole of the rotor 14 and per phase of the stator coil 40 is set to M, where M is a natural number greater than or equal to 2 and set to 2 in the present embodiment. Each of the phase windings 41U-41W of the stator coil 40 is comprised of L sub-windings U1-U5, V1-V5 or W1-W5 that are connected parallel to each other, where L is an odd number greater than or equal to 3 and set to 5 in the present embodiment. For each of the sub-windings, the in-slot portion 51C of the sub-winding which is arranged at the Nth layer in one of the slots 31 of the stator core 30 is electrically connected with the in-slot portion 51C of the sub-winding which is arranged at the (N+1)th layer in another one of the slots 31, where N is an arbitrary natural number greater than or equal to 1 and less than K (i.e., less than 6 in the present embodiment). Each of the phase windings 41U-41W of the stator coil 40 is mounted on the stator core 30 so that at each of the K layers (i.e., the first to the sixth layers in the present embodiment), the in-slot portions 51C of the sub-windings of the phase winding are arranged in a plurality (e.g., 10 in the present embodiment) of slot groups. The slot groups are circumferentially spaced from one another and each consist of M (i.e., 2 in the present embodiment) consecutive slots 31 of the stator core 30 that are sequentially identified respectively as M different types of slots 31 (i.e., two types A and B as shown in FIG. 19 in the present embodiment). The number of magnetic poles formed in the stator 20 during operation of the rotating electric machine 1 is set to a multiple of L (i.e., 2×5=10 in the present embodiment). For each of the sub-windings U1-U5, V1-V5 and W1-W5 of the phase windings 41U-41W of the stator coil 40, the in-slot portions 51C of the sub-winding are evenly distributed to the M types of the slots 31 at each of the K layers so that the number of the in-slot portions 51C of the sub-winding arranged in the slots 31 of the same type at each of the K layers is equal to the quotient of the number of the magnetic poles to be formed in the stator 20 divided by L (i.e., equal to 10/5=2 in the present embodiment). For example, as shown in FIGS. 19 and 20, for each of the sub-windings U1-U5 of the phase winding 41U, the in-slot portions 51C of the sub-winding are evenly distributed to the two types A and B of the U-phase slots 31 at each of the six layers so that: the number of the in-slot portions 51C of the sub-winding arranged in the U-phase slots A at each of the six layers is equal to 2; and the number of the in-slot portions 51C of the sub-winding arranged in the U-phase slots B at each of the six layers is also equal to 2.

With the above configuration, it becomes possible to achieve an electrical balance between the parallel-connected sub-windings U1-U5 of the U-phase winding 41U, between the parallel-connected sub-windings V1-V5 of the V-phase winding 41V and between the parallel-connected sub-windings W1-W5 of the W-phase winding 41W. Consequently, it becomes possible to prevent circulating current from being generated in the sub-windings U1-U5, V1-V5 and W1-W5 of the phase windings 41U-41W of the stator coil 40, thereby minimizing the electrical loss of the rotating electric machine 1.

Moreover, in the present embodiment, for each of the phase windings 41U-41W of the stator coil 40, the sub-windings of the phase winding are arranged with rotational symmetry so as to be circumferentially offset from one another by the offset angle of 360°/L (i.e., 360°/5=72° in the present embodiment).

With the above configuration, it becomes possible for the sub-windings U1-U5, V1-V5 and W1-W5 of the phase windings 41U-41W of the stator coil 40 to have the same shape and the same path length. Consequently, it becomes possible to equalize the phase resistances of the stator coil 40. As a result, it becomes possible to prevent an electric current bias from occurring in the stator coil 40 due to a difference in the phase resistances, thereby preventing the electrical loss of the rotating electric machine 1 from being increased due to an electric current bias in the stator coil 40.

In the present embodiment, the number of the magnetic poles formed in the stator 20 during operation of the rotating electric machine 1 is set to 2×L, i.e., the least common multiple of 2 and the number of the sub-windings of each of the phase windings 41U-41W of the stator coil 40.

Setting the number of the magnetic poles as above, it is possible to increase the efficiency of the rotating electric machine 1. This is because the less the number of the magnetic poles, the lower the frequency for the same rpm (revolutions per minutes) and thus the lower the electrical loss of the rotating electric machine 1.

In the present embodiment, the stator coil 40 is wave-wound on the stator core 30.

Consequently, torque variation due to decentering of the rotor 14 is small in comparison with the case of lap-winding the stator coil 40 on the stator core 30. Therefore, even when the rotor 14 is slightly decentered, it is still possible to suppress occurrence of circulating current in the stator coil 40.

While the above particular embodiment has been shown and described, it will be understood by those skilled in the art that various modifications, changes, and improvements may be made without departing from the spirit of the present invention.

For example, in the above-described embodiment, each of the phase windings 41U-41W of the stator coil 40 is comprised of the sub-windings U1-U5, V1-V5 or W1-W5. That is, L is set to 5. However, L may also be set to other odd numbers greater than or equal to 3.

In the above-described embodiment, the stator coil 40 is distributedly wave-wound on the stator core 30. However, the stator coil 40 may also be distributedly lap-wound on the stator core 30.

In the above-described embodiment, in each of the slots 31 of the stator core 30, there are received the in-slot portions 51C of only one of the phase windings 41U-41W of the stator coil 40. In other words, for each of the slots 31, all the in-slot portions 51C received in the slot 31 are of the same phase. However, in each of the slots 31, there may be received the in-slot portions 51C of different phases provided that: at each of the K layers, the in-slot portions 51C of any one of the phase windings 41U-41W are arranged in a plurality of slot groups, the slot groups being circumferentially spaced from one another and each consisting of M circumferentially-adjacent slots 31 of the stator core 30.

In the above-described embodiment, the present invention is directed to the stator 20 of the rotating electric machine 1 that is designed to be used in a motor vehicle as an electric motor. However, the present invention can also be applied to stators of other rotating electric machines, such as a stator of an electric generator or a stator of a motor-generator that can selectively function either as an electric motor or as an electric generator.

What is claimed is:

1. A stator for a rotating electric machine, the stator comprising:
    an annular stator core having a plurality of slots arranged in a circumferential direction thereof; and
    a three-phase stator coil comprised of three phase windings that are mounted on the stator core so as to be different in electrical phase from each other, the phase windings being star-connected with each other to define a neutral point therebetween, each of the phase windings including a plurality of in-slot portions each of which is received in one of the slots of the stator core, wherein
    in each of the slots of the stator core, there are arranged K of the in-slot portions of the phase windings of the stator coil in K layers so as to be radially aligned with each other, where K is an even number,
    the number of the slots formed in the stator core per magnetic pole of a rotor of the rotating electric machine and per phase of the stator coil is set to M, where M is a natural number greater than or equal to 2,
    each of the phase windings of the stator coil is comprised of L sub-windings that are connected parallel to each other, where L is an odd number greater than or equal to 3,
    for each of the sub-windings, the in-slot portion of the sub-winding which is arranged at a Nth layer in one of the slots of the stator core is electrically connected with the in-slot portion of the sub-winding which is arranged at a (N+1)th layer in another one of the slots, where N is a natural number greater than or equal to 1 and less than K,
    each of the phase windings of the stator coil is mounted on the stator core so that at each of the K layers, the in-slot portions of the sub-windings of the phase winding are arranged in a plurality of slot groups, the slot groups being circumferentially spaced from one another and each consisting of M consecutive slots of the stator core that are sequentially identified respectively as M different types of slots,
    number of magnetic poles to be formed in the stator during operation of the rotating electric machine is set to a multiple of L, and
    for each of the sub-windings of the phase windings of the stator coil, the in-slot portions of the sub-winding are evenly distributed to the M types of the slots at each of the K layers so that the number of the in-slot portions of the sub-winding arranged in the slots of a same type at each of the K layers is equal to a quotient of the number of the magnetic poles to be formed in the stator divided by L.

2. The stator as set forth in claim 1, wherein for each of the phase windings of the stator coil, the L sub-windings of the phase winding are arranged with rotational symmetry so as to be circumferentially offset from one another by an offset angle of 360°/L.

3. The stator as set forth in claim 2, wherein the number of the magnetic poles to be formed in the stator during operation of the rotating electric machine is set to 2×L.

4. The stator as set forth in claim 3, wherein the stator coil is wave-wound on the stator core.

5. The stator as set forth in claim 1, wherein the number of the magnetic poles to be formed in the stator during operation of the rotating electric machine is set to 2×L.

6. The stator as set forth in claim 1, wherein the stator coil is wave-wound on the stator core.

* * * * *